W. M. FAIRFAX.
SYSTEM FOR DISTRIBUTING AND REGULATING ELECTRICAL ENERGY IN THE FORM OF ALTERNATING CURRENTS.
APPLICATION FILED MAR. 1, 1915.
1,168,065. Patented Jan. 11, 1916.
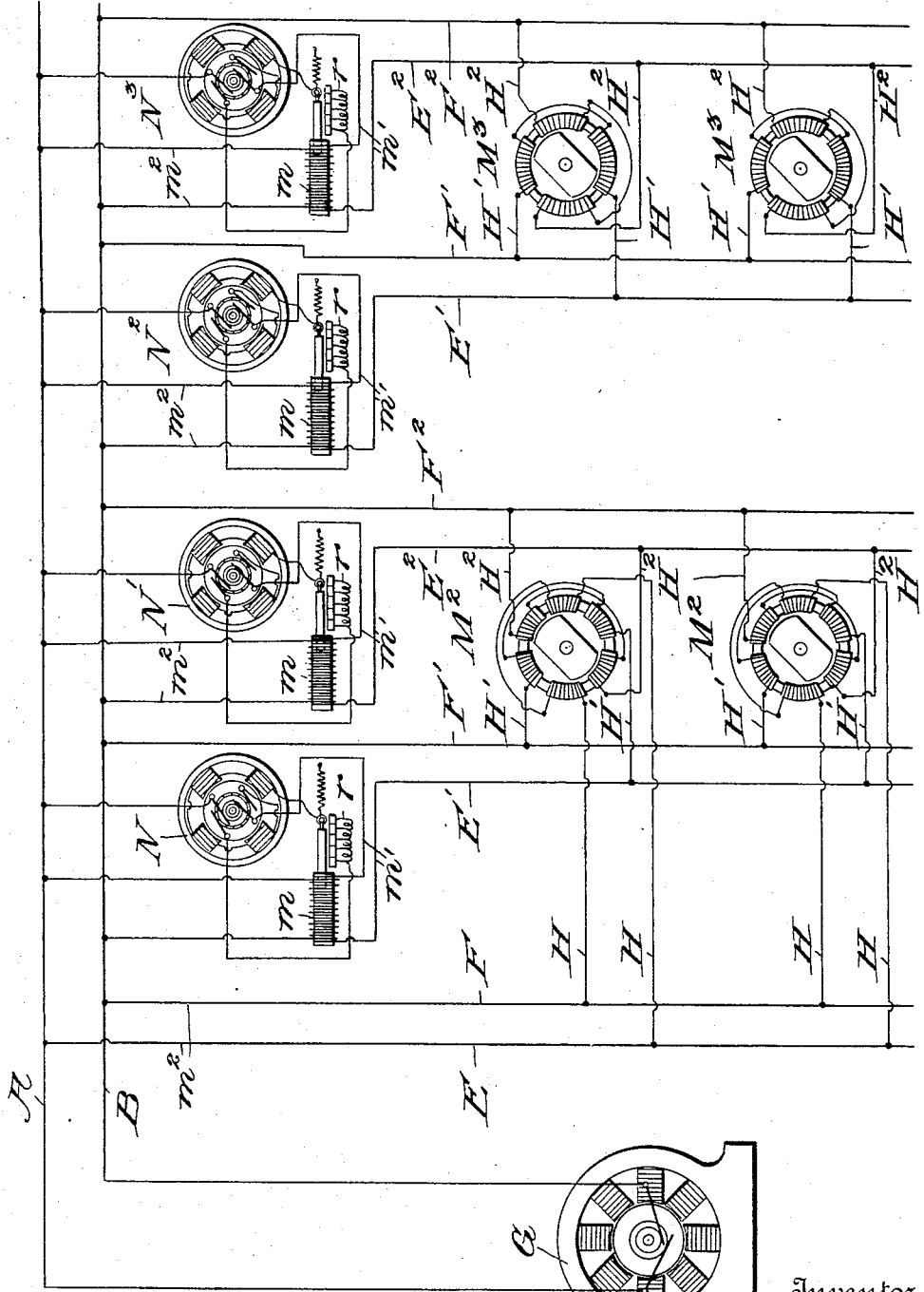
Witnesses
Inventor
William M. Fairfax

UNITED STATES PATENT OFFICE.

WILLIAM M. FAIRFAX, OF WASHINGTON, DISTRICT OF COLUMBIA.

SYSTEM FOR DISTRIBUTING AND REGULATING ELECTRICAL ENERGY IN THE FORM OF ALTERNATING CURRENTS.

1,168,065. Specification of Letters Patent. Patented Jan. 11, 1916.

Original application filed December 24, 1897, Serial No. 663,405. Divided and this application filed March 1, 1915. Serial No. 11,215.

*To all whom it may concern:*

Be it known that I, WILLIAM M. FAIRFAX, a citizen of the United States, residing at Washington, District of Columbia, have invented new and useful Improvements in Systems for Distributing and Regulating Electrical Energy in the Form of Alternating Currents.

This is a division of my pending application Serial No. 663,405, filed December 24, 1897, Systems of generating, transmitting electrical energy, etc.

My invention relates to distributing and regulating electrical energy in the form of alternating currents.

It is desirable in a wide area system, such as involves my improvements, to transmit the energy between the generating station, or stations, and the distributing centers, or between main distributing centers and sub-distributing centers, in various ways according to the requirements of particular cases; thus, in some parts of the system, it might be, and usually would be, desirable to supply the energy in the form of single phase alternating currents over feeders, and then at a distributing point, transform said single phase alternating currents into alternating currents of displaced phases, such as bi-phase or tri-phase currents.

I have found that a synchronous motor will act, under proper conditions, to shift the phases of current and electromotive force received from a circuit, or circuits, so as to permit the production of de-phased currents from single phase supply mains carrying single phase currents, and, therefore, to enable energy to be derived from single phase mains connected to single phase source, or sources, and then to be transformed into energy in the form of de-phased currents, such as two-phase and three-phase currents to be used in running rotary field power motors.

The drawing illustrates an arrangement of apparatus involving my way of producing, from a single phase main carrying single phase alternating currents, de-phased currents of the bi-phase and tri-phase type, by the action of synchronous motors, combined with my automatic phase modifying apparatus.

E, F, E', F', E², F², are three branch circuits taken from the single phase mains A, B, and in two of these branches are shown synchronous motors N, N', which are used to displace the phase say 60°, in opposite directions in their respective circuits from the current phase in the main circuit. The third circuit E, F, supplies through reverse connections current to a third set of windings current displaced in phase 120° from the current in the other windings. Of course, if these branch circuits were to have produced in them bi-phase currents, only two branch circuits would have been used with the currents displaced in phase 45° in opposite directions from the main currents in A B. M², M², are rotary field motors connected to these branch circuits E F, E' F', E² F² usually in parallel and receiving de-phased currents therefrom. These rotary field motors may be power producers such as shown in the drawing, or in general multi-A. C. current translating devices, as for instance multi-phase translating and responsive devices of various types.

The drawing shows a method of producing from a single phase current bi-phase currents, or three phase currents, from a single phase main. In each one of these branch circuits, E', F', is inserted in series a synchronous motor N, N', whose field magnets are energized by rectified current from separate windings on its armature and in whose field magnet circuit is shown a variable resistance $r$ controlled by a magnet $m$ having two coils, one $m'$ in series in the branch E' F', and another coil $m^2$ connected to the main circuit as a branch circuit therewith. The difference of phase between these two coils when increased obviously tends to make them act with increased differential effect and therefore with a weaker resultant effect on the core of the magnet; thus if the phase difference of the current in the two coils on the magnet is small, say 5°, they would practically act cumulatively, but, if the phase difference is increased, their resultant effect is obviously diminished till at 180°, if such angle was ever reached, the coils would be completely differential to each other. From this it is plain that on a decrease of phase difference between the current in the two coils and a decrease of phase angle between the currents flowing in the main circuit and the branch circuits more than was desired, all that would be necessary to do would be to have the magnet increase the over excitation of N, or under excitation, of say the field magnet of the synchronous motor N'. On an increase of phase difference between the currents in the two branch circuits E, F, the decreased action of N and N' occurs.

(N acts as a condenser or phase advancer and N' as a phase retarder). In other words the magnets $m$ are caused to act on the magnetism of the field of either motor N, N', in such a way as to increase the phase difference of the currents in the main circuit and the branch circuit when it had become too small and to decrease it when it became too large. Thus motor N is over excited as to its field a sufficient degree to cause the current to be advanced over that of the impressed volts and, in fact, this motor acts as if it were a condenser advancing the phase of the current in the branch in which it is placed. In this case the motor N is intended to advance the phase of the current about 60° ahead of the impressed volts. The motor N' acts through its field being sufficiently under excited to cause the current in the branch in which it is placed $E^2 F^2$, to lag, say 60° behind the impressed electromotive force. These two branches E' F' and $E^2 F^2$ have flowing in them respectively, currents displaced from each other 120°. A third branch circuit E F leads from the mains A B and by reversed connections supplies currents which are shifted 120° from the other two currents. This will be apparent when we realize that if the current in the main line A B is intermediate between the currents in E' F' and $E^2 F^2$ and equidistant a current flowing in the opposite direction, such as reverse connections would give, would be 180° from the main line current and therefore 120° from each of the currents in E' F' and $E^2 F^2$.

We have at our disposal here three currents differing by 120° in phase from each other. These currents are supplied through branches H I and H' I' $H^2 I^2$ to the exciting coils of motors $M^2 M^2$. The field magnets of the phase shifting motors N and N' can be variably excited through the regulating action of the magnets in series in the branches E' F' and $E^2 F^2$ to compensate for any variations due to variations of load, etc.

Farther along are shown in the same figure motors $N^3 N^3$ for dephasing the currents in branches $E^4$, $F^4$, $E^5$, $F^5$, from the currents in the main line, the one in advance and the other behind said currents in the main line about 45° thus producing resultant currents 90° from each other.

I desire to be understood that the term "electro-dynamic producers of electro-motive forces" means any dynamo-electric or electro-dynamic machine in which there is a relative movement between conductors and a field of force through which said conductors pass in which there would be set up by said movement electro-motive forces of any desired phase relation with those originally flowing on the circuit connected to said electro-dynamic producers.

What I claim is:

1. The combination of the single phase circuit of an alternating current supply system, branch circuits leading from said single phase circuit, a translating device energized by said branch circuits in the operation of which different conditions tend to produce variations in the phase relation of the currents in said branch circuits, and means in one of said branch circuits for shifting the phase of its current with relation to the current in another of said branch circuits with automatic means responsive to changes in circuit conditions for modifying the action of said phase shifting means.

2. The combination of a single phase circuit of an alternating current supply system, branch circuits leading from said single phase circuit, a polyphase motor energized by said branch circuits in the operation of which different conditions tend to produce variations in the phase relation of the currents in said branch circuits, and means in one of said branch circuits for shifting the phase of its current with relation to the current in another of said branch circuits with automatic means responsive to changes in circuit conditions for modifying the action of said phase shifting means.

3. The combination of a single phase circuit of an alternating current supply system, branch circuits leading from said single phase circuit, an induction motor connected to said branch circuits, and means in one of said branch circuits for shifting the phase of its current with relation to the current in another of said branch circuits with automatic means responsive to changes in circuit conditions for modifying the action of said phase shifting means.

4. The combination of a single phase circuit of an alternating current supply system, branch circuits leading from said single phase circuit, a multi-phase translating and responsive device energized by said branch circuits in the operation of which different conditions tend to produce variations in the phase relation of the currents in said branch circuits and thereby impair the torque and efficiency of the device, with means for shifting the phase of the current in one of said branch circuits with relation to the current in another of said branch circuits and for automatically modifying the action of the phase shifting means in response to changes in circuit conditions.

5. The combination of a single phase circuit of an alternating current supply system, branch circuits leading from said single phase circuit, a multi-phase translating device energized by said branch circuits in the operation of which different conditions tend to produce variations in the phase relations of the currents in said branch circuits, and means in one of said branch circuits for shifting the phase of its current with relation to the current in another of said branch circuits with automatic means responsive to load and circuit changes for modifying the action of the phase shifting means and tending to maintain the phase relations.

In testimony whereof I affix my signature, in presence of two witnesses.

WILLIAM M. FAIRFAX.

Witnesses:
SPENCER B. PRENTISS,
WILLIAM E. TUCKER.

Copies of this patent may be obtained for five cents each, by addressing the "Commissioner of Patents, Washington, D. C."